(12) United States Patent
Post et al.

(10) Patent No.: US 6,891,382 B2
(45) Date of Patent: May 10, 2005

(54) THREE-DIMENSIONAL CHARACTERIZATION USING A ONE-DIMENSIONAL ELECTRODE ARRAY

(75) Inventors: E. Rehmatulla Post, Somerville, MA (US); Neil Gershenfeld, Somerville, MA (US)

(73) Assignee: Massachusetts Instiute of Technology, Cambridge, MA (US)

( * ) Notice: Subject to any disclaimer, the term of this patent is extended or adjusted under 35 U.S.C. 154(b) by 0 days.

(21) Appl. No.: 10/684,817

(22) Filed: Oct. 14, 2003

(65) Prior Publication Data

US 2004/0183553 A1 Sep. 23, 2004

Related U.S. Application Data

(60) Provisional application No. 60/418,670, filed on Oct. 15, 2002.

(51) Int. Cl.[7] ............................................. G01R 27/26
(52) U.S. Cl. ....................................... 324/663; 324/662
(58) Field of Search ................................ 324/661, 662, 324/663, 671, 674, 691, 695

(56) References Cited

U.S. PATENT DOCUMENTS

| | | | |
|---|---|---|---|
| 3,219,925 A | 11/1965 | Borley et al. ................ 324/662 |
| 3,732,538 A | 5/1973 | Gillund et al. ............ 340/457.1 |
| 3,774,238 A | 11/1973 | Hardway ...................... 324/663 |
| 3,781,672 A | 12/1973 | Maltby ......................... 324/663 |
| 3,843,924 A | 10/1974 | Wahlgreen ................... 324/725 |
| 4,016,490 A | 4/1977 | Weckenmann et al. ..... 324/671 |
| 4,136,291 A | 1/1979 | Waldron ....................... 327/77 |
| 4,614,937 A | 9/1986 | Poujois ......................... 341/33 |
| 4,688,141 A | 8/1987 | Bernard et al. ............. 361/233 |
| 4,887,024 A | 12/1989 | Sugiyama et al. .......... 324/674 |
| 4,958,129 A | 9/1990 | Poduje et al. ............... 324/661 |
| 4,972,154 A | 11/1990 | Bechtel et al. .............. 324/663 |
| 4,980,519 A | 12/1990 | Mathews .................. 178/19.01 |
| 5,071,160 A | 12/1991 | White et al. ................. 280/735 |
| 5,087,825 A | 2/1992 | Ingraham .............. 307/132 EA |
| 5,130,661 A | 7/1992 | Beck et al. .................. 324/663 |
| 5,130,672 A | 7/1992 | Watkiss ......................... 331/65 |
| 5,134,379 A | 7/1992 | Maher ......................... 324/663 |
| 5,166,679 A | 11/1992 | Vranish et al. ......... 340/870.37 |
| 5,189,377 A | 2/1993 | Rhoades ...................... 324/662 |
| 5,189,417 A | 2/1993 | Caldwell et al. .............. 341/26 |
| 5,214,388 A | 5/1993 | Vranish et al. ............. 324/683 |
| 5,225,959 A | 7/1993 | Stearns ..................... 361/283.1 |
| 5,232,243 A | 8/1993 | Blackburn et al. .......... 280/732 |
| 5,247,261 A * | 9/1993 | Gershenfeld ................ 324/716 |
| 5,247,281 A | 9/1993 | Facon et al. ................. 340/562 |
| 5,258,443 A | 11/1993 | Howing ....................... 324/501 |
| 5,305,017 A | 4/1994 | Gerpheide ................... 345/174 |
| 5,330,226 A | 7/1994 | Gentry et al. ............... 280/735 |
| 5,366,241 A | 11/1994 | Kithil .......................... 280/735 |
| 5,400,487 A | 3/1995 | Gioutsos et al. ............ 280/735 |
| 5,413,378 A | 5/1995 | Steffens, Jr. et al. ........ 280/735 |
| 5,418,468 A | 5/1995 | Baker .......................... 324/674 |
| 5,432,671 A | 7/1995 | Allavena ..................... 361/280 |
| 5,436,613 A | 7/1995 | Ghosh et al. ............. 340/573.1 |
| 5,439,249 A | 8/1995 | Steffens, Jr. et al. ........ 280/735 |
| 5,446,661 A | 8/1995 | Gioutsos et al. .............. 701/45 |
| 5,454,266 A * | 10/1995 | Chevroulet et al. ...... 73/514.18 |
| 5,463,388 A | 10/1995 | Boie et al. .................... 341/33 |
| 5,525,843 A | 6/1996 | Howing ....................... 307/9.1 |
| 5,602,734 A | 2/1997 | Kithil .......................... 701/45 |
| 5,708,369 A * | 1/1998 | Horn ........................... 324/688 |

(Continued)

Primary Examiner—Anjan Deb
Assistant Examiner—Walter Benson

(57) ABSTRACT

Three-dimensional characterization wherein an object interacts capacitively with a resistive medium and the object's orientation, mass distribution and/or distance from the medium is characterized by electrodes distributed linearly around the medium's perimeter. Thus, three-dimensional characteristics are projected into two dimensions and sensed along a single dimension.

18 Claims, 9 Drawing Sheets

U.S. PATENT DOCUMENTS

| | | | |
|---|---|---|---|
| 5,730,165 A | 3/1998 | Philipp | 137/1 |
| 5,844,415 A | 12/1998 | Gershenfeld et al. | 324/663 |
| 5,914,610 A | 6/1999 | Gershenfeld et al. | 324/663 |
| 5,936,412 A | 8/1999 | Gershenfeld et al. | 324/663 |
| 6,515,490 B1 * | 2/2003 | Upton | 324/662 |
| 6,611,141 B1 * | 8/2003 | Schulz et al. | 324/226 |
| 6,703,819 B2 * | 3/2004 | Gascoyne et al. | 324/71.4 |

* cited by examiner

* cited by examiner

THREE-DIMENSIONAL CHARACTERIZATION USING A ONE-DIMENSIONAL ELECTRODE ARRAY

RELATED APPLICATION

This application claims the benefits of and priority to U.S. Provisional Patent Application No. 60/418,670, filed on Oct. 15, 2002, the entire disclosure of which is hereby incorporated by reference.

STATEMENT REGARDING FEDERALLY SPONSORED RESEARCH OR DEVELOPMENT

This invention was made with government support under Contract No. CCR-0122419 awarded by the National Science Foundation. The government has certain rights in the invention.

FIELD OF THE INVENTION

The present invention relates generally to the sensing of orientation, position and distribution of mass within a defined space, and in particular to a sensing system wherein a two-dimensional impedance distribution is characterized by electrodes distributed linearly around the perimeter of a resistive medium.

BACKGROUND OF THE INVENTION

Position sensors are used to provide inputs for a variety of electronic devices. Some of these sensors are electromechanical devices, such as the ubiquitous "mouse" that is used to provide position input signals to digital computers. Other sensors, which are non-mechanical, usually make use of electrostatic or magnetic fields to provide position information. An example of an electrostatic sensor is a capacitive button switch, which is actuated when the user places a finger thereon; in so doing the user effectively increases the capacitance of a capacitor, with the resulting increase in capacitive current being sensed to indicate actuation of the button.

Non-mechanical sensors are advantageous in that they have no moving parts and moreover are, in theory at least, not restricted to operation over a small area such as a mousepad or the like. Actually, however, because of configuration and sensitivity considerations, these sensors are limited to a small area; indeed, when they are used as "pushbuttons," this is a desirable attribute of capacitive sensors.

Electromechanical sensors are limited by their construction to detection of specific types of user movements. For example, a mouse can detect position along a two-dimensional surface and transmit the user's actuation of "click" buttons mounted on the mouse; three-dimensional location and gestures other than the familiar button click, however, are beyond the mouse's capacity to detect. The prior electrostatic and magnetic sensors suffer from the same disabilities.

In fact, determining the position, mass distribution or orientation of an object within a defined space represents a highly complex problem. Solutions have been proposed for free space measurements; see, e.g., U.S. Pat. Nos. 5,844,415 and 6,066,954. However, these solutions require electrodes arranged throughout the space of interest. This may not be practical in all applications. For example, it may be inconvenient to distribute electrodes in spaces the size of a room, or the necessary locations may be physically inaccessible or render the electrodes susceptible to damage.

SUMMARY OF THE INVENTION

In accordance with the present invention, an object interacts capacitively with a resistive medium and the object's orientation, mass distribution and/or distance from the medium is characterized by electrodes distributed linearly around the medium's perimeter. As a result, three-dimensional characteristics are projected into two dimensions and sensed along a single dimension. Accordingly, the electrodes are conveniently placed within a wide variety of environments and contexts, and the approach scales quite well. It is found that a large number of electrodes is not necessary to determine the centroid of the mass with precision. The ability to characterize the distribution (e.g., the shape) of the mass, however, increases as electrodes are added.

In one aspect, the invention comprises a method of characterizing a three-dimensional position and/or a size of one or more electrically conductive masses within a defined space. In accordance with the method, a resistive medium (e.g., in the form of a sheet) is disposed such that a surface thereof is proximate to the space. A series of spaced-apart electrodes is connected to the resistive medium along the periphery thereof, and an AC signal is sent through at least some of the electrodes into the resistive medium, thereby capacitively coupling the mass or masses to the resistive medium. The result is creation of a charge distribution, affected by the at least one mass, in the medium. In one embodiment, the size and/or the position of the mass or masses relative to the surface is inferred based on this charge distribution. In another embodiment, a voltage difference is measured between an electrode through which an AC signal is sent and an electrode through which the AC signal is not sent. Based at least on this difference and knowledge of electrode position, a two-dimensional location of a centroid of the mass or masses relative to the resistive medium is inferred. Obviously, these two embodiments can be combined in a single system.

In another aspect, the invention comprises an apparatus for characterizing a three-dimensional position and/or a size of one or more electrically conductive masses within a defined space. The apparatus comprises a resistive medium having a surface locatable proximate to the space, a series of spaced-apart electrodes connected to the resistive medium along its periphery, an AC source, and circuitry for performing operations leading to the desired characterization. In one embodiment, the apparatus comprises control circuitry for causing the AC source to send an AC signal through at least some of the electrodes and into the resistive medium, thereby capacitively coupling the mass or masses to the resistive medium and creating a charge distribution, affected by the at least one mass, in the medium, as well as circuitry for sensing the charge distribution and, based thereon, inferring at least one of the size and the position of the at least one mass relative to the surface. In another embodiment, the apparatus comprises circuitry for measuring a voltage difference between an electrode through which an AC signal is sent and an electrode through which the AC signal is not sent, and circuitry for inferring a two-dimensional location of a centroid of the mass or masses relative to the resistive medium based at least on locations of the electrodes and the voltage difference.

BRIEF DESCRIPTION OF THE DRAWINGS

The foregoing discussion will be understood more readily form the following detailed description of the invention, when taken in conjunction with the accompanying drawings, in which.

DETAILED DESCRIPTION OF THE INVENTION

Figure 1:
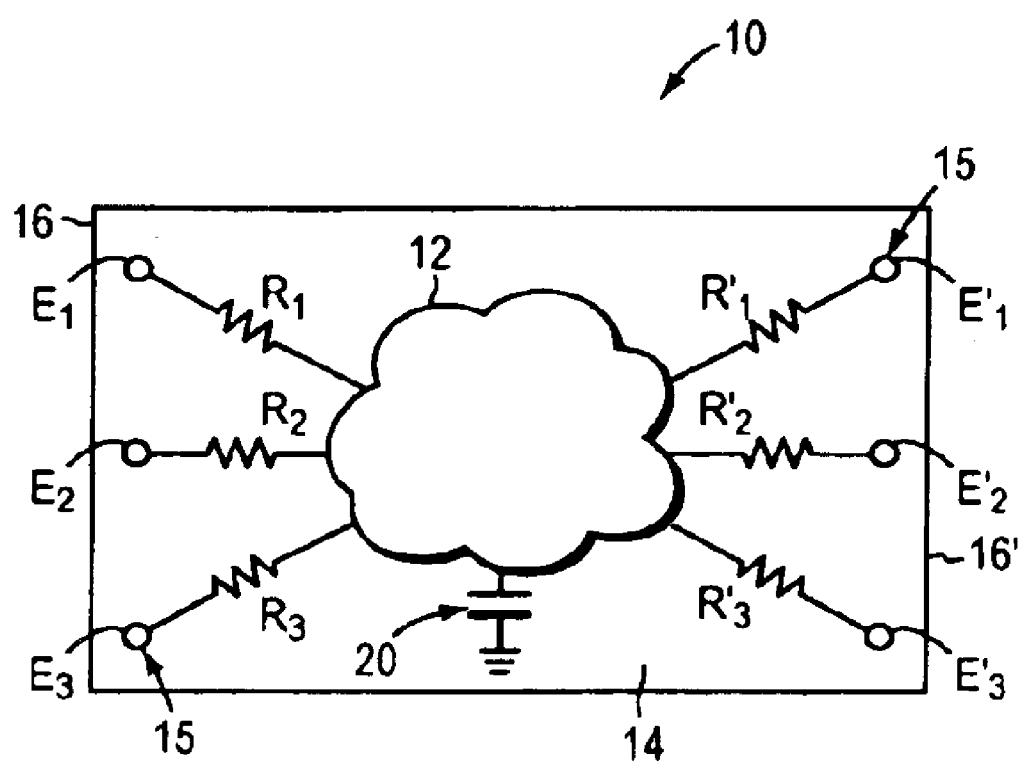
FIG. 1 schematically illustrates a general case of two-dimensional projective measurement.

As shown in FIG. 1, a simple position sensor 10 is arranged to sense a characteristic of an electrically conductive mass 12 within a defined space using a resistive medium 14 disposed proximate to the space. For example, the resistive medium 14 may be a surface bounding one side of the space, e.g., the underside of a table or the wall of a room. The resistive medium 14 may be composed of, for example, carbon-loaded plastic.

As illustrated, the position sensor 10 includes a representative series of electrodes, $E_1$, $E_2$, $E_3$, physically or otherwise connected to the medium 14 along one periphery 16 thereof, and a series of electrodes, $E_1'$, $E_2'$, $E_3'$, along a second periphery 16' opposed to the periphery 16. For present purposes, electrodes $E_1$, $E_2$, $E_3$ are "sending" electrodes that receive current from a power source and inject it into the medium 14, and electrodes $E_1'$, $E_2'$, $E_3'$, are "receiving" electrodes that are used to sense current and voltage. An AC signal is applied to the sending electrodes $E_1$, $E_2$, $E_3$. As a result, the conductive mass 12 is capacitively coupled to the resistive medium 14. As shown FIG. 1, the conductive mass 12 can be modeled as a resistive element capacitively coupled to ground (with the quality of the connection to ground determining the impedance of the capacitor 20). Each electrode $E_1$, $E_2$, $E_3$, and $E_1'$, $E_2'$, $E_3'$, is effectively connected to the grounded mass 12 by a corresponding implicit resistive element $R_1$, $R_2$, $R_3$, and $R_1'$, $R_2'$, $R_3'$. The values of the various resistors, which represent the portions of the resistive medium 14 through which current travels to and from the sending and receiving electrodes via mass 12, naturally depend on the respective distances of the mass 12 from the electrodes.

Figure 2:
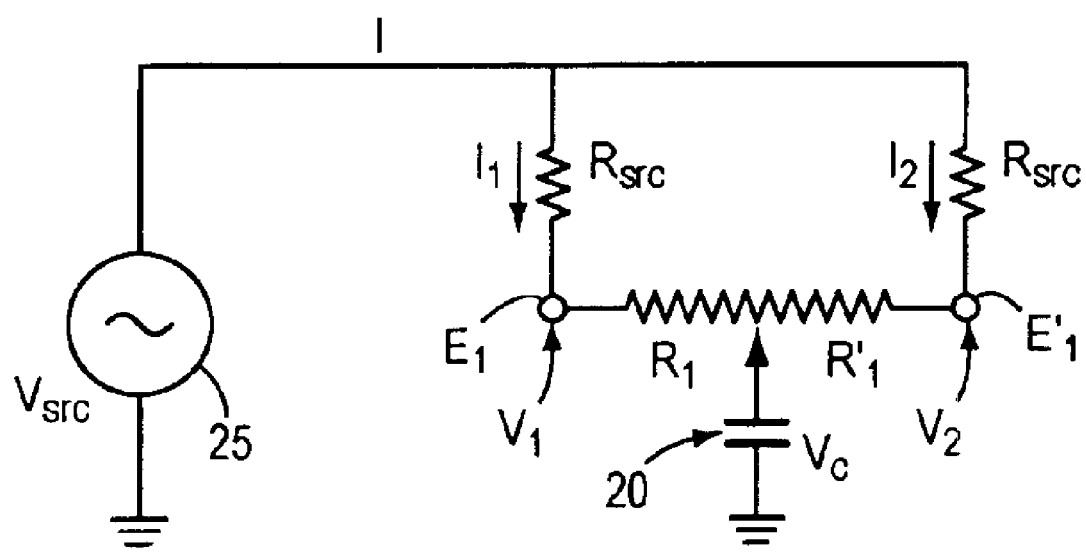
FIG. 2 schematically illustrates a two-electrode sensing arrangement for measuring position along a one-dimensional resistive element.

FIG. 2 is a completely schematic depiction of the system 10 shown in FIG. 1, but for simplicity considered only for a single sending electrode $E_1$ and a single receiving electrode $E_1'$. The resistances $R_1$ and $R_1'$ are in series, and their relative magnitudes depend on the position of the mass 12 relative to the electrodes $E_1$, $E_1'$. The effect is equivalent to current flowing through a potentiometer with a grounded wiping contact, with the voltage at each endpoint (i.e., electrode), $V_1$, and $V_2$, determined by its distance from the wiper. The quantity $R_{src}$ represents the internal impedance of the power source 25. This quantity is large relative to the resistances $R_1$ and $R_1'$ so that the power source 25 effectively behaves as a current source.

The voltage, $V_C$, across capacitor 20 and the capacitance, C, of the capacitor 20, may be determined from the knowledge of the frequency ω of the power source 25 and the total current, I, injected into the resistive medium 14, given that:

$$I = I_1 + I_2 = \frac{2V_{src} - V_1 - V_2}{R_{src}} = V_C \omega C \qquad (1)$$

Therefore it is possible to obtain $R_1$ and $R_2$ in terms of observables as $$R_1 = \frac{V_1 - V_C}{I_1} \qquad (2)$$

$$R_2 = \frac{V_2 - V_C}{I_2} \qquad (3)$$

$$C = \frac{2V_{src} - V_1 - V_2}{\omega R_{src} V_C} \qquad (4)$$

Accordingly, the position of the mass 12 (or, more accurately, the centroid of the mass 12) as between electrodes $E_1$ and $E_1'$ may be determined by the relative values of resistances $R_1$, $R_1'$ (as indicated by the voltages at electrodes $E_1$, $E_1'$).

Figure 3:
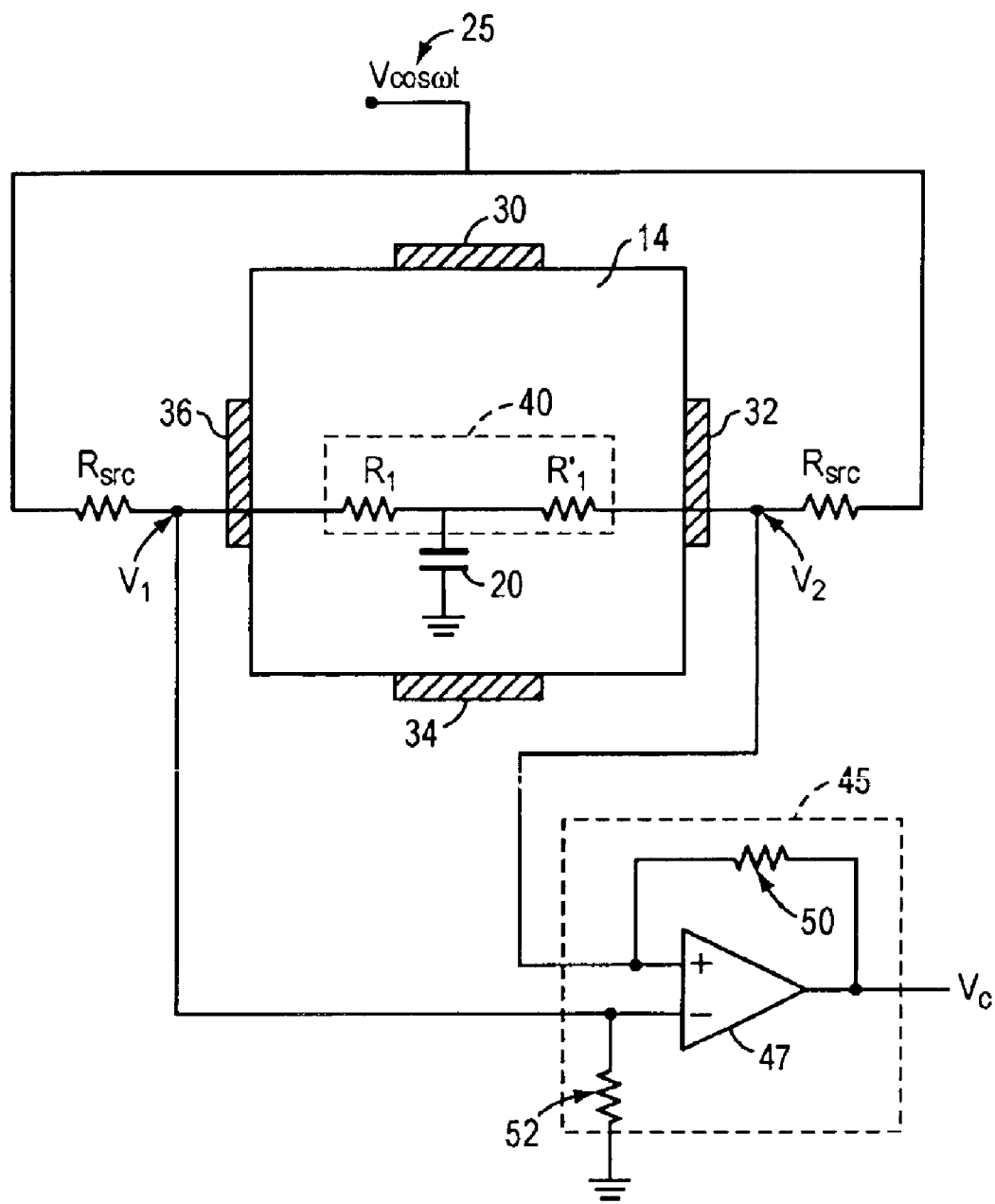
FIG. 3 is a schematic view of a four-electrode measurement system.

In more realistic systems, the electrodes are distributed evenly around the periphery of the resistive medium 14; thus, as shown in FIG. 3 for a rectangular medium, one of a series of electrodes 30, 32, 34 and 36 is connected to each edge of the resistive medium 14. It should be understood, however, that the number of electrodes can be increased to enhance system resolution, as described below. As a result, the electrodes are arranged in a linear path around the resistive medium 14.

In FIG. 3, the power source 25, having a given frequency and impedance $R_{src}$, is shown driving each side of a resistive divider 40 as described above and defined by the electrodes 32, 36 into a capacitive load 20 (representing the mass 12). (Connection to the electrodes 30, 34 is discussed below.) The voltages $V_1$, $V_2$ developed at the ends of the resistive element (i.e., at the electrodes 32, 36) is proportional to the resistance between the corresponding end of the resistive divider and the contact capacitance of the capacitive load 20, providing a proportional measurement of the capacitive contact position of the mass. The quantity $R_2 - R_1$ is sensed by an amplifier arrangement 45. The inverting terminal of an operational amplifier 47 is connected to, e.g., the electrode 36 and the other electrode (i.e., electrode 32) is connected to the non-inverting amplifier terminal. A resistor 50 bridges the non-inverting input terminal and the output terminal. A leakage resistor 52 precedes the inverting input terminal of the operational amplifier 47. The voltages at the electrodes 32, 36 are proportional to the resistances $R_1$, $R_2$, so the output of the amplifier 47 reflects the magnitude of this difference and may be used to determine the values of $R_1$ and $R_2$. Accordingly, the accuracy with which the centroid of the mass 12 can be localized as between two opposed electrodes depends primarily on the accuracy with which the voltage difference between the electrodes can be measured. The number of electrodes around the perimeter of the medium 14 is less critical, as long as that number is adequate for the shape of the medium. For example, with even a single electrode on each side of a square medium 14, the centroid of the mass 12 can be localized with reasonable accuracy given sufficient precision in making voltage measurements.

Figure 4:
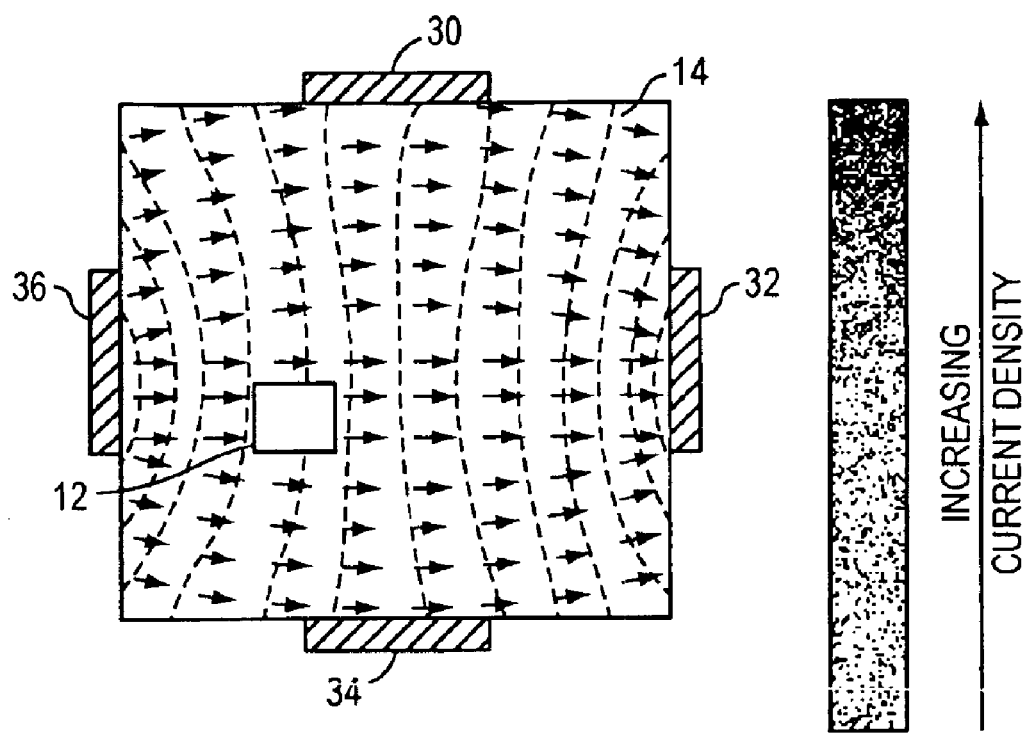
FIG. 4 shows the current density and equipotentials in a resistive medium with two active electrodes.

The behavior of the circuit shown in FIG. 3 is illustrated in FIG. 4. In the absence of the mass 12, charge in the homogeneous resistive medium would be distributed symmetrically with concentrations at the electrodes 32, 36, and voltages at these electrodes would be equal. Capacitive coupling of the mass 12 disrupts this symmetry (i.e., it alters the impedance distribution of the system, which in turn dictates the charge distribution). The degree to which charge is drawn to the region of the mass 12 depends on the quality of its connection to ground, its size and its distance (if any) from the resistive medium 14.

The asymmetry in voltage between the electrodes 32, 36 is a direct measure of the position of the capacitively coupled grounding load (i.e., the mass 12). If the load were centered on the sheet, then similar voltages would develop at the electrodes 32, 36 (e.g., 4.0 V and −4.0 V), while if the load were at the left edge of the medium 14, one would expect to more highly skewed voltage measurements (e.g., −8 V and 0 V, respectively, at the electrodes 32, 36). In other words, the current flowing through the medium 14 establishes a potential gradient (indicated by the solid lines representing isopotential contours) while the mass 12 provides a movable ground reference that determines the voltages that develop at the electrodes 32, 36.

Figure 5A:
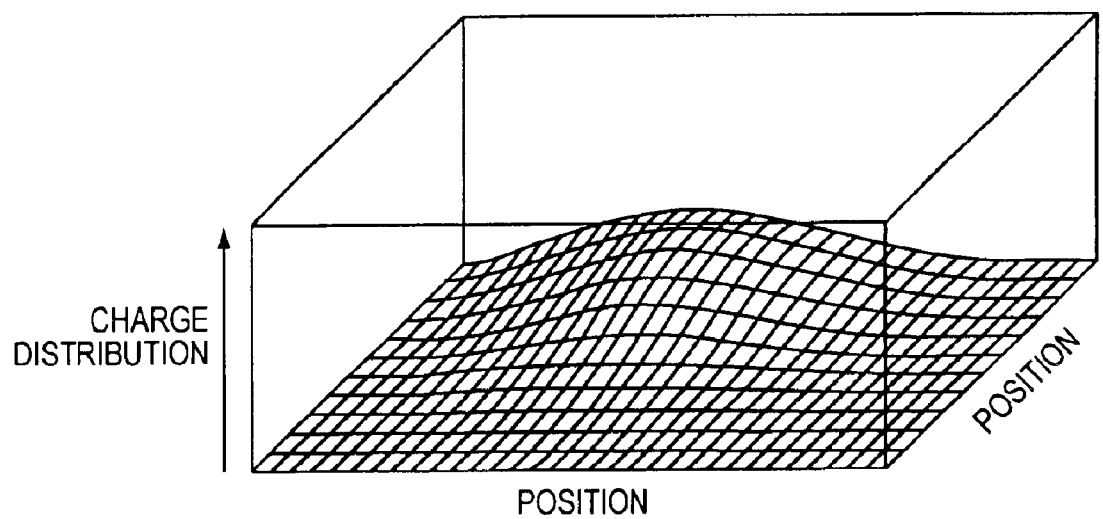
FIGS. 5A and 5B topographically depict the charge distribution the resistive medium due to the presence of masses of different sizes and/or distances from the resistive medium.
Figure 5B:
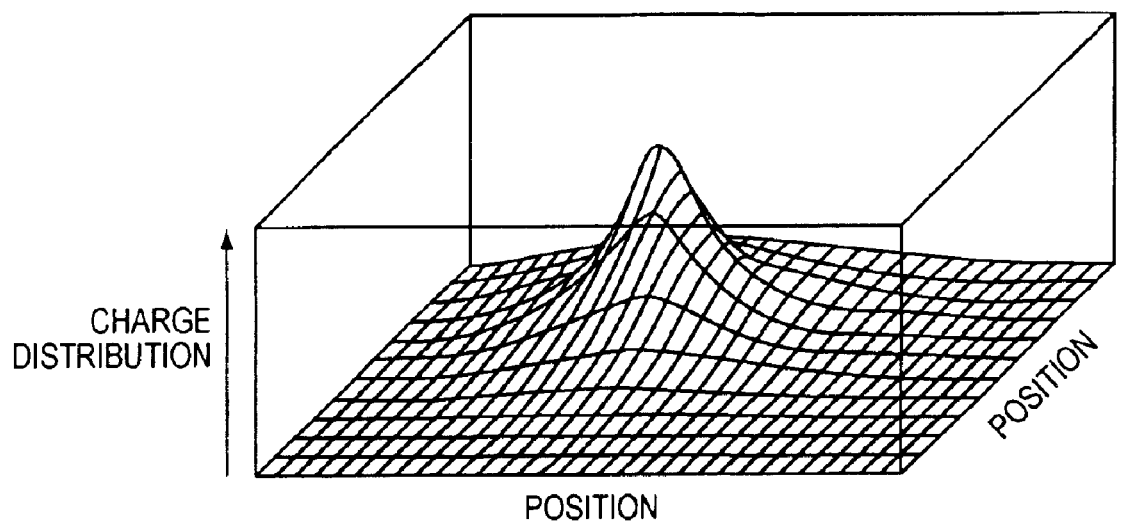

FIGS. 5A and 5B topographically depict the charge distribution in the resistive medium 14 for two different cases. For a given mass, as the distance between the mass 12 and the resistive medium 14 increases, the charge distribution becomes more diffuse and its concentration in the region of the mass 12 less pronounced as shown in FIG. 5A. Alternatively, as depicted in FIG. 5B, when the distance between the mass 12 and the resistive medium 14 decreases, the charge distribution narrows and its concentration in the region of the mass 12 becomes more pronounced. Similarly, a large but poorly coupled mass may produce the charge distribution shown in FIG. 5A even if proximate to the resistive medium 14, while a small, well-coupled mass may produce the charge distribution shown in FIG. 5B even if relatively distant from the resistive medium 14. Thus, the distance from the mass 12 to the resistive medium 14 may be estimated if the size of mass 12 is known, or the size of the mass 12 may be estimated if its distance from the resistive medium is known.

Unlike localizing the centroid of the mass 12, the ability to characterize the charge distribution depends strongly on the number of peripheral electrodes surrounding the resistive medium 14. The more electrodes that are employed, the greater will be the resolution with which the charge distribution can be characterized. In order to maximize the resolution for a given number of electrodes, measurements can be obtained sequentially using different sets of electrodes.

Figure 6A:
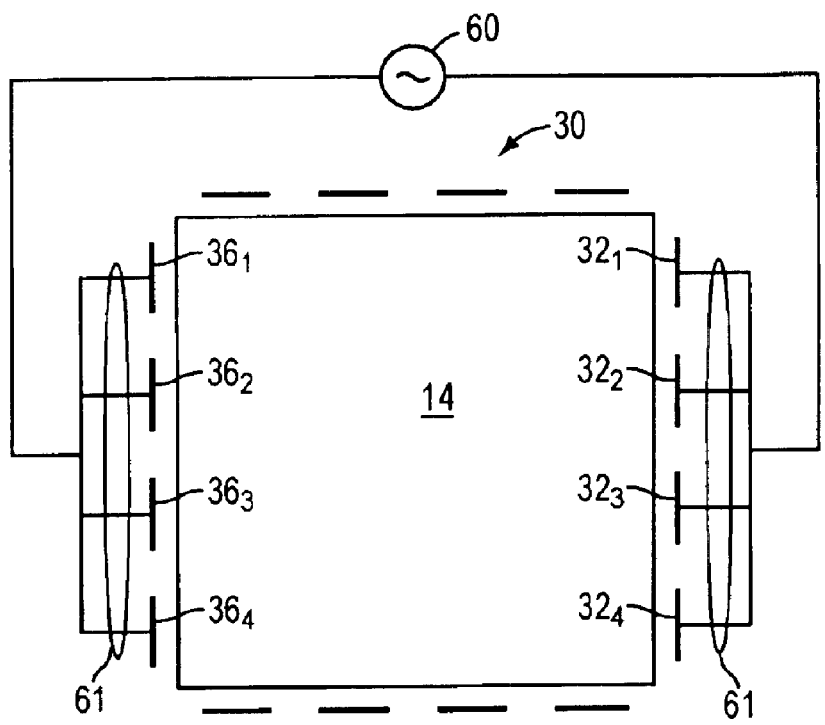
FIGS. 6A and 6B illustrate the manner in which different sets of electrodes may be activated in accordance with the invention.

In FIG. 6A an AC source 60 is connected to the resistive medium 14 via the left-side electrodes $36_1, 36_2, 36_3, 36_4$ and the right-side electrodes $32_1, 32_2, 32_3, 32_4$. Current-sensing devices generically indicated at 61, connected individually to each of the electrodes 32, 36, measure current through these electrodes. These measurements provide information used to characterize the impedance distribution in the medium 14. (Not shown in FIGS. 6A and 6B is the capacitively coupled mass that causes the charge distribution to become asymmetric.)

Figure 6B:
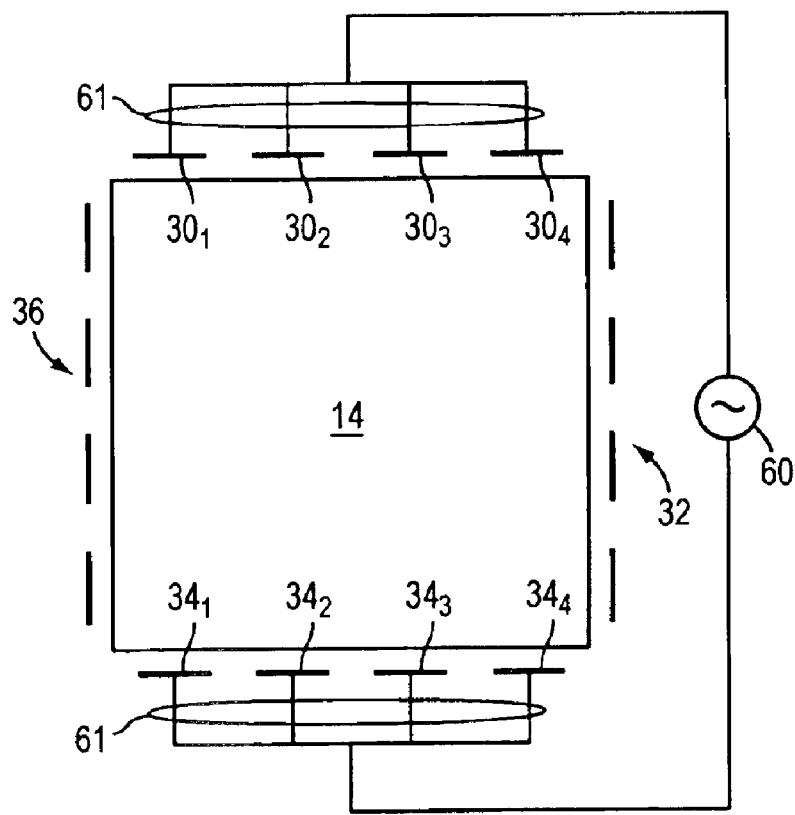

FIG. 6B illustrates that the AC source 60 may then be connected to the upper electrodes $30_1, 30_2, 30_3, 30_4$ and the lower electrodes $34_1, 34_2, 34_3, 34_4$. Measurements of current through these electrodes further contribute to an accurate characterization of the impedance distribution in the medium 14. It should be emphasized that although it is natural to simultaneously activate all electrodes on opposed sides of a rectangular medium as illustrated, in fact the sets of electrodes activated at any one time may depend on various factors, including the desired resolution and the shape of the medium 14.

Figure 7:
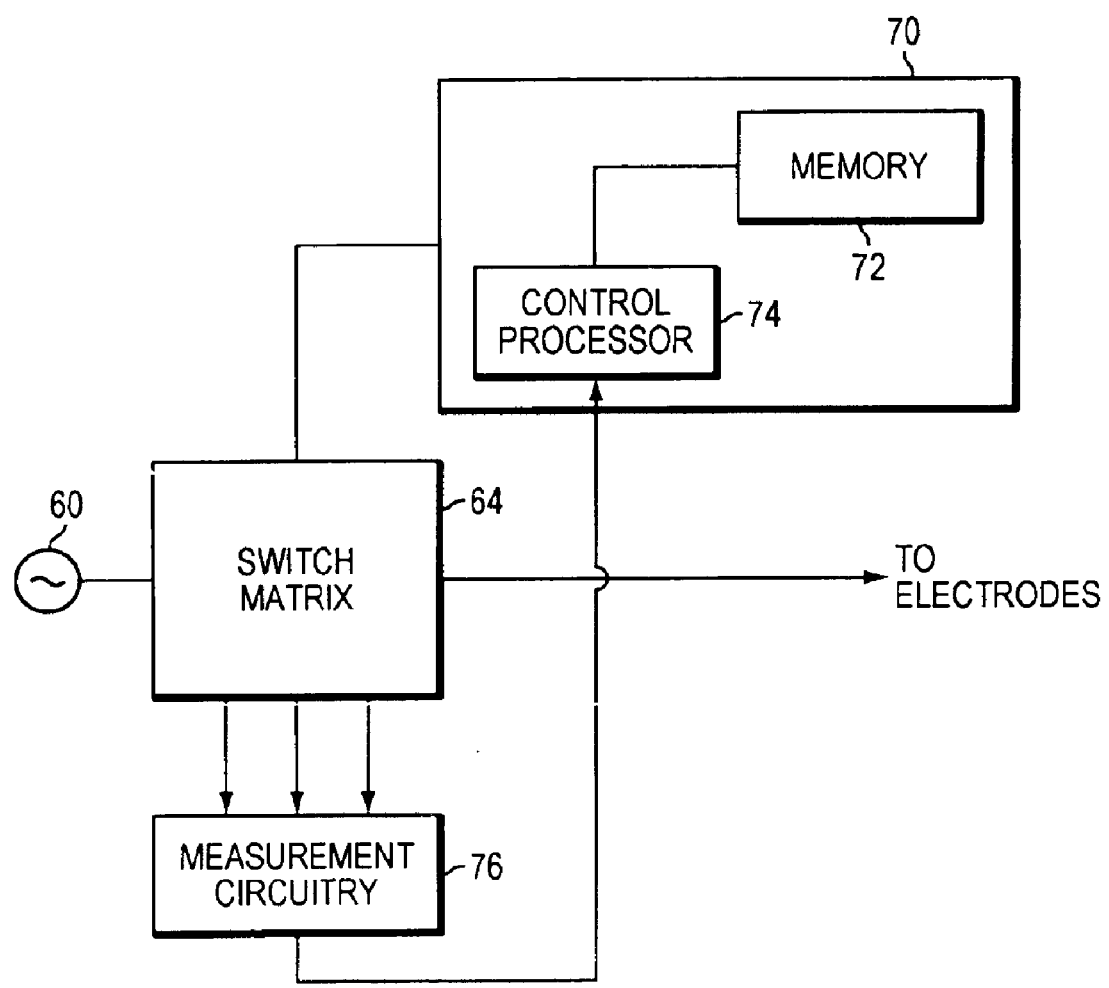
FIG. 7 is a schematic diagram of switch logic that may be used to alter the modes in which the various electrodes operate.

FIG. 7 depicts representative switch logic used to select the various electrodes that are connected to the power source and to measure the voltage on (to determine the centroid of the mass 14) and the current through (to characterize the charge distribution) each active electrode. The circuit includes the AC source 60 and a switch matrix 64 under the control of a computer 70 including a memory 72 and a processor 74. The memory unit 72 of the computer 70 stores both data and executable programming instructions. In the simplest approach, these instructions cause the processor 74 to operate the switch matrix 64 to sequentially couple different ones of the electrodes to the AC source 60 and other electrodes to voltage and current measurement circuitry generically indicated at 76. The measurement circuitry may be in the form of hardware (as discussed below) or, instead, the electrodes may be connected directly to the processor 74 via a multiple-port analog-to-digital converter. In the latter case, the processor is programmed to measure the sensed current and voltage levels. In any case, the measurements are stored in a memory 72 and analyzed to characterize the charge distribution.

Figure 8:
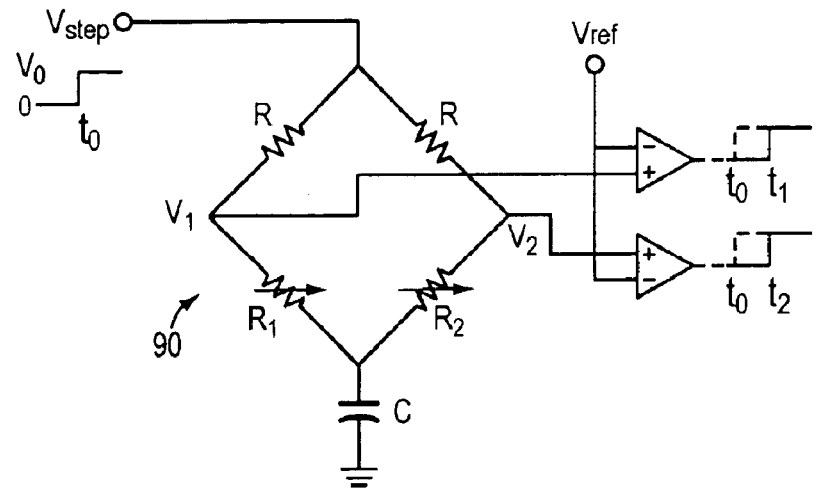
FIG. 8 illustrates the general principle of a single projective measurement using two current paths.

FIG. 8 illustrates another approach to measuring comparative voltage levels $V_1, V_2$ between two electrodes. This approach scales well and may be implemented according to the architecture shown in FIG. 7. As shown in FIG. 8, an analog bridge measurement circuit 90 uses comparators to obtain a time-domain measurement of the current flowing in each arm of the bridge. At time t=0, a voltage step $V_0$ (i.e., $V_{step}=V_0$) is applied to the top of the bridge. The current flowing down one arm of the bridge will depend on the resistance in that arm and the voltage difference across the arm, i.e. $I(t)=(V_0-V_C(t))/(R+R_1)$, where $V_C(t)$ is the voltage developed across the load capacitance, R is the source impedance, and $R_1$ is the variable resistance corresponding to the distance between the source electrode and the capacitive load. $V_C(t)$ is proportional to $I(t)$.

$$V_C(t)=V_0-(R+R_1)I(t) \tag{6}$$

and that it follows an exponential characteristic $$V_C(t)=V_0(1-e^{t/R_{par}C}) \tag{7}$$

where $R_{par}$ is the total parallel resistance feeding C. Once again, $R>>R_1$ and $R>>R_2$, so $R_{par}\approx R/2$, so $V_C(t)$ is relatively insensitive to $R_1$ and $R_2$. However, the comparators in FIG. 8 measure $$V_1=V_C(t)+R_1I(t)$$

and $$V_2=V_C(t)+R_2I(t) \tag{8}$$

against some reference voltage $V_{ref}$. The comparators will trigger at different times that depend on $R_1$ and $R_2$. Comparing these times $t_1$ and $t_2$ facilitates computation of $R_1$ and $R_2$, and thus the position of the capacitive load along the axis defined by the two electrodes.

Figure 9:
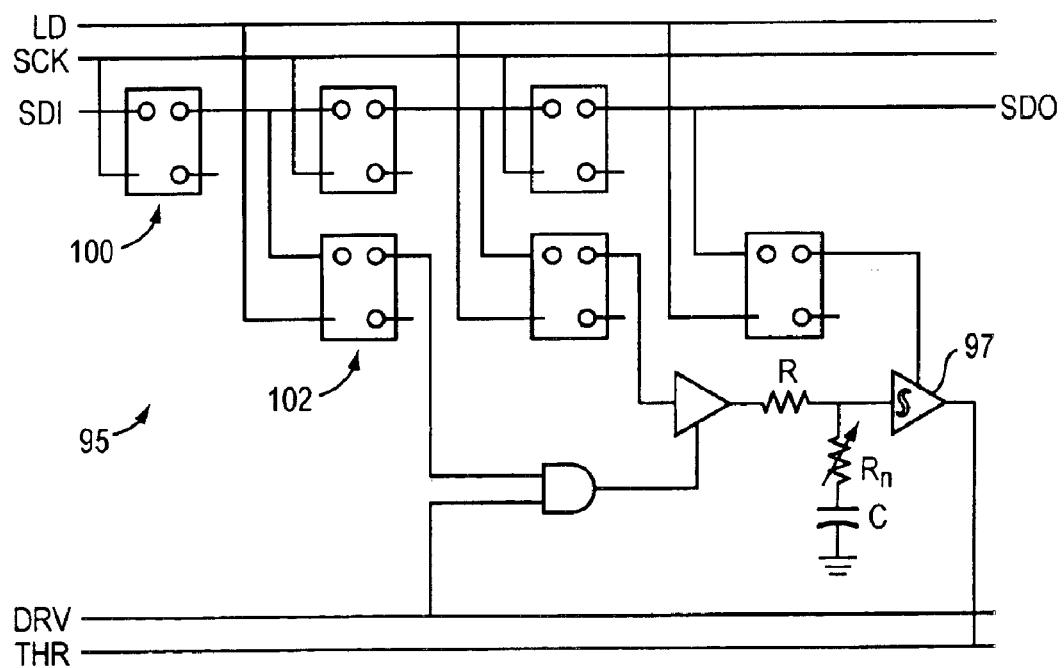
FIG. 9 schematically illustrates a circuit implementing one branch of the measurement bridge shown in FIG. 8.

To utilize this approach in the context of the present invention, each arm of the bridge shown in FIG. 8 may be implemented in the form of the the circuit 95 in FIG. 9. The circuit 95 includes the explicit source impedance R as well as the implicit load C and sheet resistance $R_n$. The comparator is replaced by a Schmitt trigger 97, the output of which is disabled when the electrode is not active. This boundary-scan circuit 95 is repeated at each electrode around the perimeter of the resistive medium, and all of the circuits are wired in series. A serial bit stream is provided at one end to the input line SDI by the computer 70 (see FIG. 7) and passes through an upper set of flip-flops 100 and thereafter to subsequent circuits 95 via the output line SDO. Three global control signals SCK (serial data clock), SLD (serial data latch) and DRV (drive active electrodes) are provided to sequence the measurement operation, while the time-domain measurement is returned from the active measuring electrode as a logic edge on the global return bus THR (threshold). The SLD line and the outputs of the upper flip-flops 100 serve as inputs to a lower set 102 of flip-flops.

In operation, the computer 70 feeds serial data into the SDI line (clocked by SCK) to configure each circuit 95 in the chain. Once all data have been fed into the chain formed by the linked upper sets 100 of flip-flops, the data are latched into the lower sets 102 of flip-flops by a pulse on the SLD line. The charging time measurement is then initiated by driving the DRV line high and awaiting a rising (or falling) edge on THR. Thus, to implement the time-domain bridge measurement, two electrodes are configured to drive their outputs high at the given signal, and one of these two drives the THR output of its circuit 95. This obtains the time-domain measurement for one arm of the bridge. The measurement is then repeated with the THR output enabled for the other electrode.

Having shown the preferred embodiments, one skilled in the art will realize that many variations are possible within the scope and spirit of the claimed invention. It is therefore the intention to limit the invention only by the scope of the claims.

What is claimed is:

1. A method of characterizing at least one of a three-dimensional position and a size of at least one electrically conductive mass within a defined space, the method comprising the steps of:
   a. providing a resistive medium having a periphery and a surface proximate to the space;
   b. connecting a series of spaced-apart electrodes to the resistive medium along the periphery;
   c. sending an AC signal through at least some of the electrodes and into the resistive medium, thereby capacitively coupling at least one mass to the resistive medium and creating a charge distribution, affected by the at least one mass, in the medium; and
   d. sensing the charge distribution and, based thereon, inferring at least one of the size and the position of the at least one mass relative to the surface.

2. The method of claim 1 wherein:
   a. an AC signal is sent into the resistive medium sequentially through at least some of the electrodes;
   b. for each AC signal sent into the resistive medium, a current level through the medium is measured through at least one other of the electrodes to form a set of measurements; and
   c. the inferring step comprises deriving the position relative to the resistive medium based on the measurements.

3. The method of claim 1 further comprising the steps of:
   a. measuring a voltage difference between an electrode through which an AC signal is sent and an electrode through which the AC signal is not sent; and
   b. inferring a two-dimensional location of a centroid of the at least one mass relative to the resistive medium based at least on locations of the electrodes and the voltage difference.

4. The method of claim 1 further comprising the step of sequentially sending AC signals through different ones of the electrodes and sensing current with other electrodes, the charge distribution being characterized based on current sensed through all of the electrodes.

5. The method of claim 1 wherein the resistive medium is in the form of a sheet.

6. A method of characterizing at least one of a three-dimensional position and a size of at least one electrically conductive mass within a defined space, the method comprising the steps of:
   a. providing a resistive medium having a periphery and a surface proximate to the space;
   b. connecting a series of spaced-apart electrodes to the resistive medium along the periphery;
   c. sending an AC signal through at least some of the electrodes and into the resistive medium, thereby capacitively coupling at least one mass to the resistive medium;
   d. measuring a voltage difference between an electrode through which an AC signal is sent and an electrode through which the AC signal is not sent; and
   e. inferring a two-dimensional location of a centroid of the at least one mass relative to the resistive medium based at least on locations of the electrodes and the voltage difference.

7. The method of claim 6 wherein an AC signal is sent into the resistive medium sequentially through at least some of the electrodes, and further comprising the steps of:
   a. for each AC signal sent into the resistive medium, measuring a current level through at least one other of the electrodes to form a set of measurements; and
   b. using the measurements to characterize a charge distribution in the medium and, based thereon, inferring at least one of the size and the position of the at least one mass relative to the surface.

8. The method of claim 6 further comprising the step of sequentially sending AC signals through different ones of the electrodes and measuring voltage differences between different pairs of electrodes, the two-dimensional location being inferred based on voltage differences measured through all of the electrodes.

9. The method of claim 6 wherein the resistive medium is in the form of a sheet.

10. Apparatus for characterizing at least one of a three-dimensional position and a size of at least one electrically conductive mass within a defined space, the apparatus comprising:
    a. a resistive medium having a periphery and a surface locatable proximate to the space;
    b. a plurality of spaced-apart electrodes connected to the resistive medium along the periphery;
    c. an AC source;
    d. control circuitry for causing the AC source to send an AC signal through at least some of the electrodes and into the resistive medium, thereby capacitively coupling at least one mass to the resistive medium and creating a charge distribution, affected by the at least one mass, in the medium; and
    e. circuitry for sensing the charge distribution and, based thereon, inferring at least one of the size and the position of the at least one mass relative to the surface.

11. The apparatus of claim 10 wherein:
    a. the control circuitry causes the AC source to send AC signals into the resistive medium sequentially through at least some of the electrodes; and b. the sensing circuitry measures, for each of the AC signals sent into the resistive medium, a current level through the medium through at least one other of the electrodes to form a set of measurements from which the position relative to the resistive medium is derived.

12. The apparatus of claim 10 further comprising:
   a. circuitry for measuring a voltage difference between an electrode through which an AC signal is sent and an electrode through which the AC signal is not sent; and
   b. circuitry for inferring a two-dimensional location of a centroid of the at least one mass relative to the resistive medium based at least on locations of the electrodes and the voltage difference.

13. The apparatus of claim 11 wherein the control circuitry causes the AC source to sequentially send AC signals through different ones of the electrodes and the sensing circuitry senses current through other electrodes, the charge distribution being characterized based on current sensed through all of the electrodes.

14. The apparatus of claim 10 wherein the resistive medium is in the form of a sheet.

15. Apparatus for characterizing at least one of a three-dimensional position and a size of at least one electrically conductive mass within a defined space, the apparatus comprising:
   a. a resistive medium having a periphery and a surface locatable proximate to the space;
   b. a plurality of spaced-apart electrodes connected to the resistive medium along the periphery;
   c. an AC source;
   d. control circuitry for causing the AC source to send AC signals through at least some of the electrodes and into the resistive medium, thereby capacitively coupling at least one mass to the resistive medium;
   e. circuitry for measuring a voltage difference between an electrode through which an AC signal is sent and an electrode through which the AC signal is not sent; and
   f. circuitry for inferring a two-dimensional location of a centroid of the at least one mass relative to the resistive medium based at least on locations of the electrodes and the voltage difference.

16. The apparatus of claim 15 wherein the control circuitry causes the AC source to sequentially send AC signals through different ones of the electrodes and further comprising:
   a. circuitry for measuring, for each AC signal sent into the resistive medium, a current level through the medium via at least one other of the electrodes to form a set of measurements; and
   b. circuitry for characterizing a charge distribution in the medium based on the measurement set, the inferring circuitry inferring from the charge distribution at least one of the size and the position of the at least one mass relative to the surface.

17. The apparatus of claim 15 wherein the control circuitry causes the AC source to sequentially send AC signals through different ones of the electrodes and the measuring circuitry measures voltage differences between different pairs of electrodes, the two-dimensional location being inferred based on voltage differences measured through all of the electrodes.

18. The apparatus of claim 15 wherein the resistive medium is in the form of a sheet.

* * * * *